(12) United States Patent
Breton

(10) Patent No.: US 11,397,132 B2
(45) Date of Patent: Jul. 26, 2022

(54) APPARATUS AND METHOD FOR TESTING A VEHICLE POWERTRAIN USING A DYNAMOMETER

(71) Applicant: HORIBA INSTRUMENTS INCORPORATED, Irvine, CA (US)

(72) Inventor: Leo Alphonse Gerard Breton, Washington, DC (US)

(73) Assignee: HORIBA INSTRUMENTS INCORPORATED, Irvine, CA (US)

( * ) Notice: Subject to any disclaimer, the term of this patent is extended or adjusted under 35 U.S.C. 154(b) by 0 days.

(21) Appl. No.: 16/852,745

(22) Filed: Apr. 20, 2020

(65) Prior Publication Data

US 2020/0249123 A1  Aug. 6, 2020

Related U.S. Application Data

(63) Continuation of application No. 16/234,055, filed on Dec. 27, 2018, now Pat. No. 10,775,268.

(Continued)

(51) Int. Cl.
*G01M 15/05* (2006.01)
*G01M 15/10* (2006.01)
(Continued)

(52) U.S. Cl.
CPC .......... *G01M 15/102* (2013.01); *F01N 11/00* (2013.01); *F02B 77/084* (2013.01); *F02D 29/02* (2013.01);
(Continued)

(58) Field of Classification Search
CPC .............. G01M 15/044; G01M 15/05; G01M 17/0072; F02D 2200/0414; F02D 2200/1002
See application file for complete search history.

(56) References Cited

U.S. PATENT DOCUMENTS

| 4,680,959 A | 7/1987 | Henry et al. |
| 4,825,690 A | 5/1989 | Mears |

(Continued)

FOREIGN PATENT DOCUMENTS

| CN | 101660974 A | 3/2010 |
| CN | 102472686 A | 5/2012 |

(Continued)

OTHER PUBLICATIONS

International Search Report and Written Opinion of the International Searching Authority for International Application No. PCT/US2018/067636, dated Mar. 26, 2019, 7 pgs.

(Continued)

*Primary Examiner* — Eric S. McCall
(74) *Attorney, Agent, or Firm* — Brooks Kushman P.C.

(57) ABSTRACT

A test method for a vehicle powertrain includes, during a first test in which dynamic engine torque from a powertrain drives a vehicle on a road, recording throttle position or accelerator pedal position to define a throttle schedule, and recording engine speed to define an engine speed schedule. The test method further includes, during a second test of a vehicle engine, controlling a dynamometer and the vehicle engine according to the engine speed schedule and throttle schedule to reproduce the dynamic engine torque.

5 Claims, 9 Drawing Sheets

Related U.S. Application Data

(60) Provisional application No. 62/610,541, filed on Dec. 27, 2017.

(51) Int. Cl.
| | |
|---|---|
| *G01M 15/04* | (2006.01) |
| *F02D 41/04* | (2006.01) |
| *F02B 77/08* | (2006.01) |
| *F02D 29/02* | (2006.01) |
| *G01M 17/007* | (2006.01) |
| *F01N 11/00* | (2006.01) |

(52) U.S. Cl.
CPC ........... *F02D 41/04* (2013.01); *G01M 15/044* (2013.01); *G01M 17/0072* (2013.01); *F02D 2200/0414* (2013.01); *F02D 2200/0418* (2013.01); *F02D 2200/1002* (2013.01)

(56) References Cited

U.S. PATENT DOCUMENTS

| | | | |
|---|---|---|---|
| 6,470,732 | B1 | 10/2002 | Breton |
| 6,476,732 | B1 | 11/2002 | Breton |
| 9,870,650 | B2 * | 1/2018 | Komada ................. G07C 5/08 |
| 10,416,043 | B2 | 9/2019 | Douglas et al. |
| 10,657,734 | B2 | 5/2020 | Adachi et al. |
| 10,677,687 | B2 | 6/2020 | Pfister et al. |
| 10,775,268 | B2 | 9/2020 | Breton |
| 10,801,921 | B2 | 10/2020 | Douglas et al. |
| 2002/0091471 | A1 | 7/2002 | Suzuki |
| 2003/0184154 | A1 | 10/2003 | Joyce |
| 2005/0234629 | A1 | 10/2005 | Maruki |
| 2007/0260438 | A1 | 11/2007 | Langer et al. |
| 2008/0262712 | A1 | 10/2008 | Duty et al. |
| 2009/0198474 | A1 | 8/2009 | Fritz et al. |
| 2011/0303000 | A1 | 12/2011 | Engstrom |
| 2012/0242513 | A1 | 9/2012 | Oguchi et al. |
| 2012/0330479 | A1 | 12/2012 | Oshiro et al. |
| 2015/0219529 | A1 | 8/2015 | Akiyama et al. |
| 2015/0284007 | A1 | 10/2015 | Jeong et al. |
| 2015/0332522 | A1 * | 11/2015 | Komada ................. G07C 5/02 701/29.1 |
| 2015/0338313 | A1 | 11/2015 | Tanaka et al. |
| 2017/0268948 | A1 | 9/2017 | List et al. |
| 2018/0033217 | A1 | 2/2018 | Komada |
| 2018/0040176 | A1 | 2/2018 | Ogawa et al. |
| 2018/0372057 | A1 | 12/2018 | Douglas et al. |
| 2019/0041295 | A1 | 2/2019 | Pfister et al. |
| 2019/0113416 | A1 | 4/2019 | Harmon |

FOREIGN PATENT DOCUMENTS

| | | |
|---|---|---|
| CN | 103158717 A | 6/2013 |
| CN | 104769262 A | 7/2015 |
| CN | 104973065 A | 10/2015 |
| CN | 105092257 A | 11/2015 |
| CN | 105092259 A | 11/2015 |
| CN | 105092260 A | 11/2015 |
| EP | 3343196 A1 | 7/2018 |
| JP | S57160042 A | 10/1982 |
| JP | 2002322935 A | 11/2002 |
| JP | 2015219139 A | 12/2015 |

OTHER PUBLICATIONS

Kokujikan, "Test Procedure for Fuel Consumption Rate and Exhaust Emissions of Heavy-Duty Hybrid Electric Vehicles Using Hardware-in-the-Loop Simulator System", No. 281 of Mar. 16, 2007, 122 pgs.

* cited by examiner

APPARATUS AND METHOD FOR TESTING A VEHICLE POWERTRAIN USING A DYNAMOMETER

CROSS-REFERENCE TO RELATED APPLICATIONS

This application is a continuation of U.S. application Ser. No. 16/234,055, filed Dec. 27, 2018, which claims the benefit of U.S. Provisional App. No. 62/610,541, filed Dec. 27, 2017, both of which are incorporated by reference herein.

BACKGROUND

The present disclosure is in the technical field of automotive exhaust gas emissions measurement and analysis and the measurement of the energy efficiency of vehicles. More specifically, it is in the field of predicting the exhaust gas emissions of vehicles with Internal Combustion Engines (ICEs), including the emissions from Hybrid Electric Vehicles (HEVs) and predicting the energy efficiency of vehicles for all powertrain types operating in the real world, based on simulating real-world conditions during laboratory testing.

Modern automobiles with ICEs can operate reliably under almost any combination of environmental, road grade, and driving conditions found on Earth. Such vehicles are common throughout the world and operate regularly and reliably in ambient temperatures ranging from well below 0 C to more than 40 C, from dry desert conditions to humid rainforests, and in bumper-to-bumper, slow city traffic to high speed operation on the German Autobahn.

Many countries that host large numbers of automobiles have exhaust gas emissions standards, i.e. "tailpipe" standards that auto manufacturers must comply with. But experience has shown that it is difficult and expensive to test vehicles under the broad range of real-world environmental, road, and driving conditions that are known to affect emissions and fuel economy of vehicles in the real world. And it is well known that the energy efficiency of HEVs and the range of BEVs on a single charge decrease at lower ambient temperatures.

Laboratory-based tailpipe emissions testing has been historically performed under a limited range of ambient conditions, vehicle speed patterns, and driving conditions. Because the number of vehicles has increased dramatically in recent years worldwide, and because vehicles have become increasingly computer-controlled, it has become necessary for governments and automobile manufacturers to better understand the emissions of vehicles across a wider range of operating conditions so that National Ambient Air Quality (NAAQ) standards can continue to be met in current ambient air "attainment areas" and can eventually be met in current "non-attainment areas." It has also become necessary for vehicle manufacturers to be able to assess the effects of changes to vehicle emission controls and powertrain calibrations across a wider range of ambient and operating conditions.

New vehicle exhaust gas emissions regulations are driven, in part, by measured levels of NAAQ for specific criteria pollutants that are known to directly or indirectly affect human health and for the control of greenhouse gas emissions. NAAQ levels vary widely throughout the world, depending on both mobile emissions sources and stationary sources of pollution. Population densities, weather conditions, vehicle emissions performance, the age and makeup of the local in-use vehicle fleet, stationary sources of air pollution, and geographic features, are all factors affecting NAAQ. For example, the air quality in Southern California can be particularly poor because of a high population density, combined with a well-known atmospheric temperature inversion due to geographic features and atmospheric conditions.

Automobiles and trucks with ICEs contribute to the overall pollution from "mobile sources," most notably from "tailpipe emissions." And BEVs contribute to "stationary sources" of pollution, i.e. emissions from electrical power plants. The tailpipe emissions and energy efficiency of any particular vehicle operating in the real world is dependent on many factors, including various environmental conditions, road grade, driver behavior, traffic conditions, and the effectiveness of the vehicle's emissions controls related to those factors.

BEVs may become a significant factor of overall pollution from "stationary sources" in the future if they are produced in increasingly larger numbers because they get their energy from the power grid. Therefore, it is important to understand the energy efficiency of BEVs in real-world driving as well.

The promulgation of new emissions standards for controlling criteria pollutant and greenhouse gas emissions from vehicles with ICEs has been traditionally linked to a laboratory-based testing regime and related methodologies because laboratory-based testing can be very repeatable and because mass-based, real-world (i.e. on-road) testing had not been possible until recently, i.e. since the commercialization of Portable Emissions Measurement Systems (PEMS).

While laboratory testing methods are known to be very accurate and repeatable for emissions measurements under actual test conditions, real-world driving can subject a vehicle to a wide range of conditions that traditional laboratory testing protocols would not. There are many reasons for this, including the difficulty of simulating the full range of real-world temperature and atmospheric pressure conditions in the laboratory, the effects of real-world driver behavior under actual traffic conditions, etc.

To address the limitations of a laboratory-only testing regime for ICE vehicles, PEMS apparatuses and methods for conducting accurate, real-world testing of exhaust gas mass emissions and fuel economy from moving vehicles while they are driven in the real world have been developed. This has become increasingly important in understanding vehicle emissions that affect NAAQ, greenhouse gas emissions, and a vehicle's fuel economy.

Over the past 20 years, PEMS has become a commercial product widely used by both regulators and automobile manufacturers. For example, PEMS-based, real-world testing has become a required test methodology for the vehicle certification process in the European Union, starting in 2017. But laboratory testing continues to be a valuable tool for vehicle manufacturers during the vehicle development process and for regulators because the testing protocols produce very repeatable test results. For example, the effects on tailpipe emissions of large and small changes to a vehicle or powertrain can be precisely determined by repeat tests after introducing such changes.

SUMMARY

Here, certain embodiments may relate to conducting accurate and repeatable exhaust gas mass emissions testing of ICE vehicles (or portions thereof) and energy efficiency measurements of all vehicle types-measurements that are representative of the real-world energy efficiency and tailpipe emissions, where applicable, for any vehicle/engine model, on any route, and over any set of ambient conditions of interest. More specifically, certain embodiments relate to an apparatus and method for measuring the emissions and energy efficiency performance of a vehicle under a broad range of real-world driving conditions by conducting testing primarily in a laboratory. For example, a vehicle test method may include operating a vehicle and dynamometer, configured to provide road load to the vehicle, respectively according to a real-world vehicle throttle schedule and a real-world speed schedule defining a real-world drive cycle traveled by the vehicle on-road, capturing output torque data from the dynamometer resulting from the operating, operating the vehicle and dynamometer respectively according to the output torque data and the real-world speed schedule to replicate road load experienced by the vehicle during the real-world drive cycle, and operating the vehicle according to a real-world shift schedule further defining the real-world drive cycle. Real-world emissions data corresponding to the real-world ambient environmental conditions and road load experienced by the vehicle during the real-world drive cycle may be captured. Real-world energy efficiency data corresponding to the real-world ambient environmental conditions and road load experienced by the vehicle during the real-world drive cycle may be captured. Simulated real-world emissions data in conjunction with the replicated road load experienced by the vehicle may be captured and the replicated road load may be validated by comparing the simulated real-world emissions data to the real-world emissions data. Real-world energy efficiency data in conjunction with the replicated road load experienced by the vehicle may be captured and the replicated road load may be validated by comparing the simulated real-world energy efficiency data to the real-world energy efficiency data. The vehicle test method may further include operating the vehicle under simulated ambient environmental conditions and capturing emissions data, or operating the vehicle under simulated ambient environmental conditions and capturing energy efficiency data.

A vehicle testing laboratory is equipped with either a traditional chassis dynamometer or, alternatively, a separate axle shaft dynamometer for each vehicle drive wheel, as well as mass emissions sampling equipment for testing ICE vehicles, where applicable, and a supplemental set of testing equipment for the purpose of exposing a test vehicle to a set of environmental conditions of interest, e.g. ambient temperature, pressure, and humidity, while the vehicle is being tested.

Prior to laboratory testing, a vehicle to be tested is driven on any route(s) of interest in the real world, under any environmental and traffic conditions desired. For example, high traffic arteries in NAAQ "non-attainment areas" might be of particular interest to researchers and regulators. And cold weather fuel economy performance may be of particular interest to a manufacturer of vehicle models used more extensively by customers in colder climates.

During the real-world drive(s), a PEMS may be optionally installed on ICE equipped vehicles to measure and record mass emissions in grams per mile or grams per brake-horsepower-hour, depending on the regulatory emissions certification requirements for the vehicle. In addition to the optional emissions data, ambient weather conditions and other test parameters needed to characterize the vehicle operation are also recorded, including vehicle speed, accelerator pedal or throttle position, and brake pedal position or status (i.e. on/off) for the entire test period. For manual transmission vehicles, gear selection and clutch pedal position must also be recorded.

After the real-world testing over the desired route(s), the vehicle is then brought to the specially-equipped laboratory and either placed on the chassis dynamometer, or optionally connected to axle-shaft dynamometers (one dynamometer per drive wheel) while the laboratory's mass emissions sampling equipment (in the case of the ICE vehicles) measures mass emissions and the supplemental set of testing equipment is employed for providing the desired environmental conditions of interest during vehicle operation, i.e. environmental conditions that may be the same or may be different from those actually encountered during the real-world testing.

For the first laboratory test, the full set of real-world test conditions, inclusive of driver interactions and environmental conditions are reproduced on the chassis dynamometer by controlling the dynamometer speed to replicate the on-road vehicle speed while simultaneously controlling the accelerator pedal movement or throttle position and braking actions to replicate the on-road drive and vehicle response. The mass emissions or energy efficiency, depending on powertrain type, and the dynamometer output (feedback) torque signal throughout the test are recorded in a normal manner.

If either PEMS emissions data or energy consumption was optionally collected during the real-world driving, it can then be directly compared with the laboratory emissions or energy consumption data collected during the laboratory test under the same conditions to ensure they are equal, within an acceptable range. This optional "validation" process serves to document a high degree of confidence that both the laboratory and real-world measurements are both correct and reproducible.

Besides optional validation, the initial dynamometer testing provides an entire torque output history representative of the real-world wheel torque for the tested vehicle that is a good approximation for the wheel torque that would be found for the same vehicle in a broad range of environmental conditions when that same vehicle is operated in the same traffic conditions by the same driver. This real-world torque history, obtained in the laboratory, is then used for "torque matching" in subsequent dynamometer tests performed under different, simulated ambient environmental test conditions. Thus, the principle of "torque matching" makes it possible to accurately and precisely simulate a real-world drive under any ambient conditions of interest, for the same vehicle, speed history, driver effects, and traffic pattern.

"Torque matching" also makes it possible to accurately and precisely simulate a real-world drive after making other powertrain modifications, e.g. powertrain calibration changes or catalytic converter precious metal loadings, and to measure the impact of such modifications to the vehicle's emissions or energy efficiency performance for any modifications that do not appreciably affect the vehicle's road load.

It should be understood that direct measurement of on-road torque and subsequent "torque matching" in the laboratory is optional, but requires substantially more work preparing a vehicle for testing. For example, specialized "torque wheels" which provide an output torque signal could be installed on a vehicle in place of the normal wheels.

After the first laboratory test, ambient conditions, powertrain calibrations, emissions control changes, or other powertrain modifications can then be made and the test rerun by controlling the accelerator and brake pedals to reproduce or "match" the torque signal obtained from either a recorded dynamometer torque signal obtained during a dynamometer "validation" test or an on-road torque measurement.

Additional tests employing "torque matching" may be performed under as many different environmental conditions and powertrain changes as desired to fully characterize the emissions characteristics or energy efficiency of the test vehicle or powertrain under as wide of a range of environmental conditions and powertrain configurations as desired.

DETAILED DESCRIPTION

Figure 1:
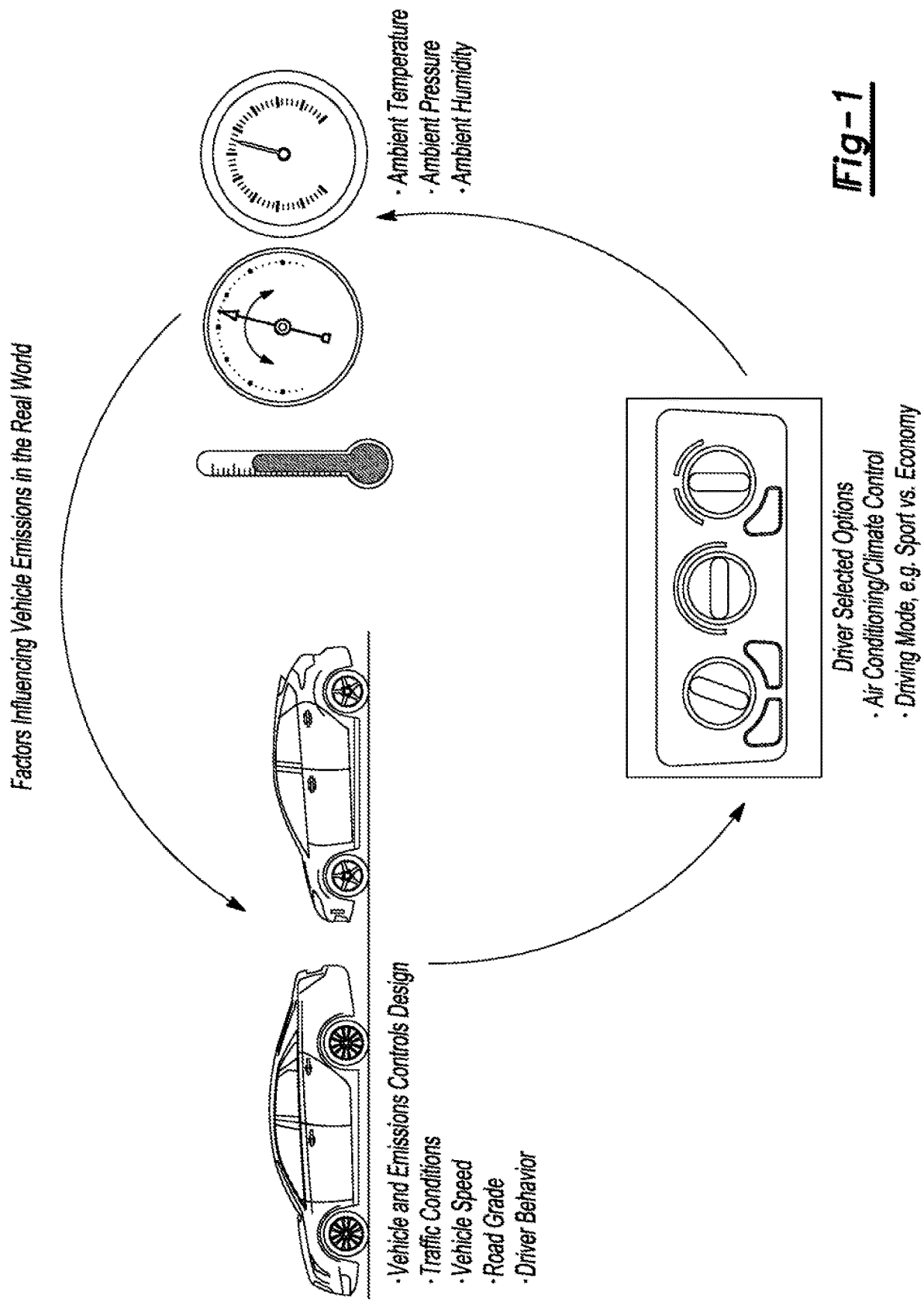
FIG. 1 shows various vehicle, driving, and traffic conditions that affect the emissions and/or the energy efficiency of a vehicle.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The use of PEMS has made it clear that current laboratory-based testing protocols often do not accurately characterize the emissions performance or energy efficiency (fuel economy) of a vehicle operating in the real world, and over a broad range of the relevant factors listed above because of the high cost and significant effort required in conducting representative laboratory testing. Similar testing limitations for BEV's exist, limiting a full understanding of energy efficiency for those vehicles operating in the real world at lower ambient temperatures and under real-world driving conditions.

In some examples, is an apparatus and a method for collecting accurate, real-world emissions and energy efficiency test data for any vehicle in an accurate and repeatable manner, over a broad range of environmental conditions not normally reproduced in a laboratory environment are contemplated. The following description shows how a testing laboratory can be used to accurately simulate real-world conditions for an arbitrary vehicle and for any combination of environmental conditions desired. In this way, compliance with emissions and energy efficiency standards can be assured by regulators and the effects of changes to a vehicle's powertrain or powertrain calibration can be accurately determined by automobile manufacturers to efficiently achieve emissions compliance and maximize fuel economy to their customers.

The testing method described above could employ other vehicle operating parameters as surrogates for the use of throttle position in real-world driving and/or for the use of torque for controlling the dynamometer. For example, fuel flow rate, fuel injector pulse width, and powertrain computer calculations for calculating powertrain torque during vehicle operation are analogous to throttle position or torque for subsequent vehicle or dynamometer control under the same real or simulated environmental conditions for laboratory testing.

Specific embodiments are discussed below. But the method of testing may be essentially the same, independent of the apparatus employed. It should be understood that these specific embodiments are for illustrative purposes only and that there is much wider applicability than this or any other single embodiment. All such embodiments are contemplated herewith.

FIG. 1 shows many of the numerous factors that affect tailpipe emissions of vehicles with ICEs as well as the energy efficiency and operating range of all vehicles in the real world. The factors are related to vehicle design, the interactions of the vehicle with its environment (ambient temperature, pressure, humidity, road grade, traffic conditions), driving style (speeds, acceleration rates, braking habits), and the use of driver-selectable options.

Figure 2:
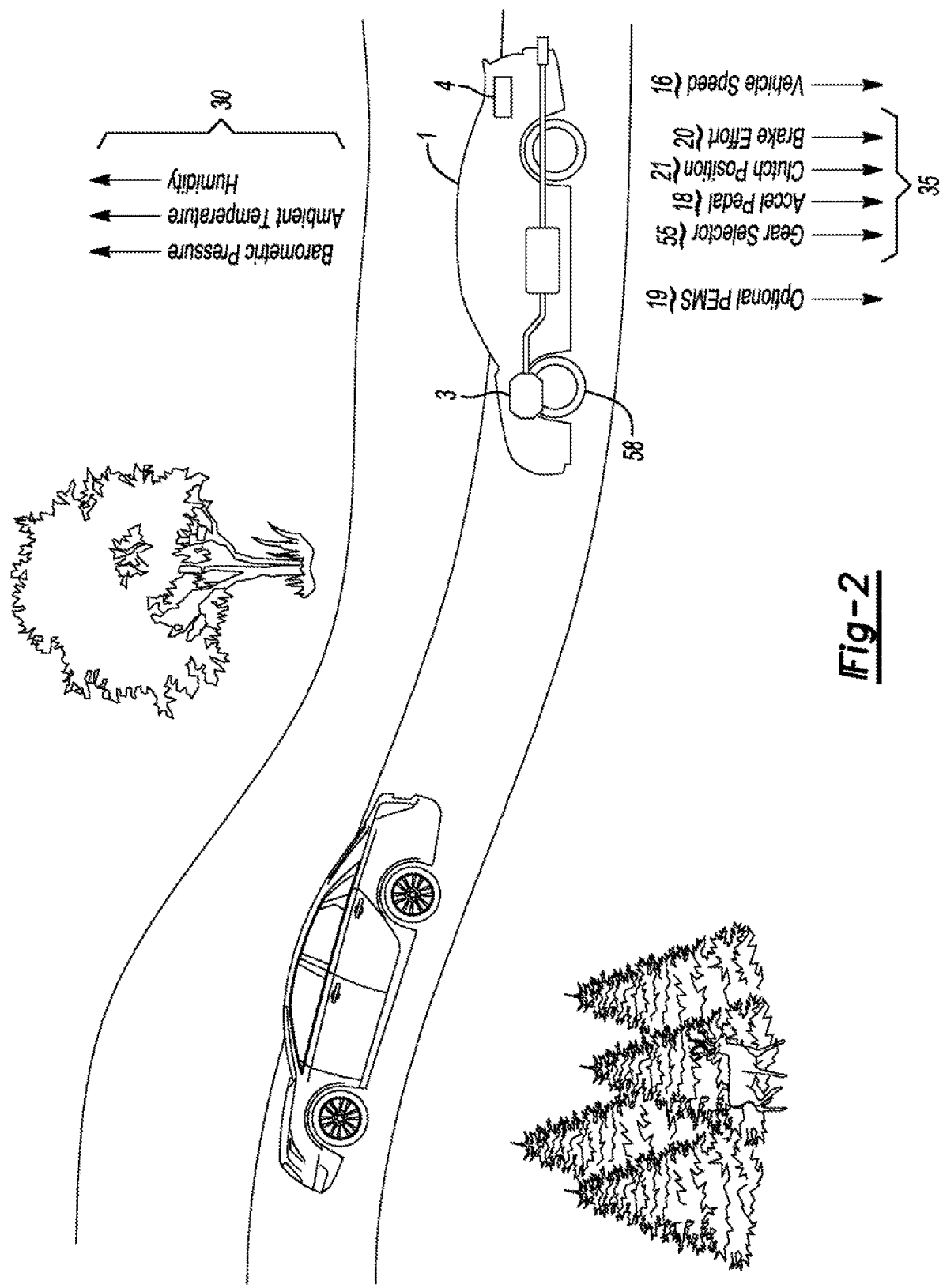
FIG. 2 shows a vehicle being tested in the real world for obtaining a set of measurements sufficient for reproducing the test in a testing laboratory, and optionally to collect actual on-road emissions and/or energy efficiency data.

FIG. 2 shows an arbitrary vehicle 1 being tested in the real world. For an ICE powertrain, real-world tailpipe 20 emissions and fuel economy data (19 collectively) are optionally collected continuously from an on-board PEMS 4 in the case of an ICE vehicle 1, or energy consumption and efficiency measurements are optionally collected continuously from a BEV powertrain. While the emissions and fuel economy data or the energy efficiency data from the real-world test is very useful by itself for evaluating the emissions or energy efficiency performance of the vehicle, it is only a narrow view or "slice" of the overall real-world performance of the vehicle 1 under generalized conditions. This is because any given test is done under a very specific set of test conditions encountered during any single real-world test. Some embodiments provide a means and method for leveraging what is learned from a relatively small number of real-world tests to enable accurate and repeatable simulations of the same vehicle under a broad range of environmental and powertrain design conditions and to collect representative emissions and fuel economy data over that broad range of conditions.

More specifically, the main purpose of the real-world road testing component is two-fold. First, to optionally obtain emissions and/or energy efficiency data for later use in validating laboratory simulations of the same real world environmental conditions. Secondly, for obtaining data that is sufficient for accurately determining the torque that was applied to the driven wheels throughout the entire real-world test, without the use or installation of specialized "torque wheels" 58 or other torque measurement devices. Of course, the "torque wheel" measurements could also be optionally used.

By determining (or directly measuring) the real-world test torque schedule, the same torque schedule can be applied to the driven wheels while the modified or unmodified vehicle is connected to a chassis dynamometer under the same, or optionally different environmental conditions, subsequently simulated in a testing laboratory.

The real world test route is chosen by the researcher for his or her purposes. For example, it may be a high traffic volume, light-duty passenger car commuter corridor during rush hour, or may be a long-duration route inclusive of a number of sub-routes that are each high volume commuter corridors, or may be any other route of interest to either regulators or automobile manufacturers. Or the test route may be one that is more applicable to heavy-duty vehicles that employ heavy-duty engines that are traditionally tested on an engine dynamometer for regulatory purposes.

Referring to FIG. 2, the vehicle 1 is driven on the road 2 in either a normal driving manner or in a manner consistent with the specific testing goals. For example, the aggressiveness of the driver could be a testing condition to test the robustness of the emissions control system. And driver-selectable options including, but not limited to air conditioning, and "sport" vs. "economy" driving mode are chosen as desired, consistent with research purposes, for the real-world test. Driver selections are recorded for subsequent reproduction in laboratory testing.

For the entire duration of the real-world testing, a vehicle speed signal 16, an accelerator pedal position or throttle position signal 18, a driver's braking actions or braking effort signal 20, a clutch pedal position signal 21, and a gear selection signal 55 are all recorded at appropriate frequencies, e.g. 50-100 Hz for the vehicle speed, accelerator pedal or throttle position, clutch and braking effort signals. CAN bus signals are ideal for this purpose if they can be obtained at a sufficient frequency, otherwise, for electronically-controlled powertrains, the signals can be obtained easily by directly sensing signals at the appropriate wiring harness locations. Other data logging means that are commonly used can also be employed.

There are many other ways of recording vehicle speed, each with its own advantages and disadvantages. For example, use of the vehicle's own toothed-wheel speed sensors for modern vehicles, accessible via the vehicle's CAN bus is a convenient way. If it is not accessible by the researcher, or is not available at approximately 50-100 Hz or higher, or if it is desirable to perform the speed measurements without the need for connecting to the vehicle's CAN bus, e.g. for older vehicles, other methods may be employed.

GPS is commonly used on PEMS but the speed may not be updated at a high enough frequency and small speed changes at a high update rate may be dominated by measurement uncertainty.

Road surface radar systems, mountable on the test vehicle is another option for obtaining vehicle speed with a high update rate, but like GPS, small speed changes may be obscured by errors introduced by vertical motion of the vehicle. And the system may have to be calibrated if the angle of incidence to the road is vehicle-dependent.

Another method for determining vehicle speed at high frequency is by employing a remote optical sensor, more specifically a retro-reflective sensor in which both the transmitter and receiver are located in the same housing and the light beam is reflected from a reflective surface applied to the moving part. In the present case, a reflective paint or sticker is applied to one of the vehicle's tires and the sensor is clamped to a control arm of the vehicle 1 suspension which is stationary relative to the location of the tire. The output frequency from the speed sensing means is equal to the rotational frequency of the tire and proportionate to the speed of the vehicle, the constant of proportionality easily determined in known ways.

An onboard "weather station" provides a continuous update 30 of ambient atmospheric conditions from which atmospheric pressure, temperature, humidity, and air speed measurements are all recorded at an appropriate frequency, e.g. 1 Hz.

For an ICE vehicle 1, a PEMS 4 may be optionally used to collect real-world tailpipe emissions and fuel economy (by carbon balance technique) data 19 for the road test, or other means, e.g. a fuel flow meter (not shown) may be used to obtain optional fuel consumption data. For a BEV vehicle 1, electrical power consumption is optionally recorded over the entire real-world drive using electrical means commonly used in the field (not shown).

Figure 3:
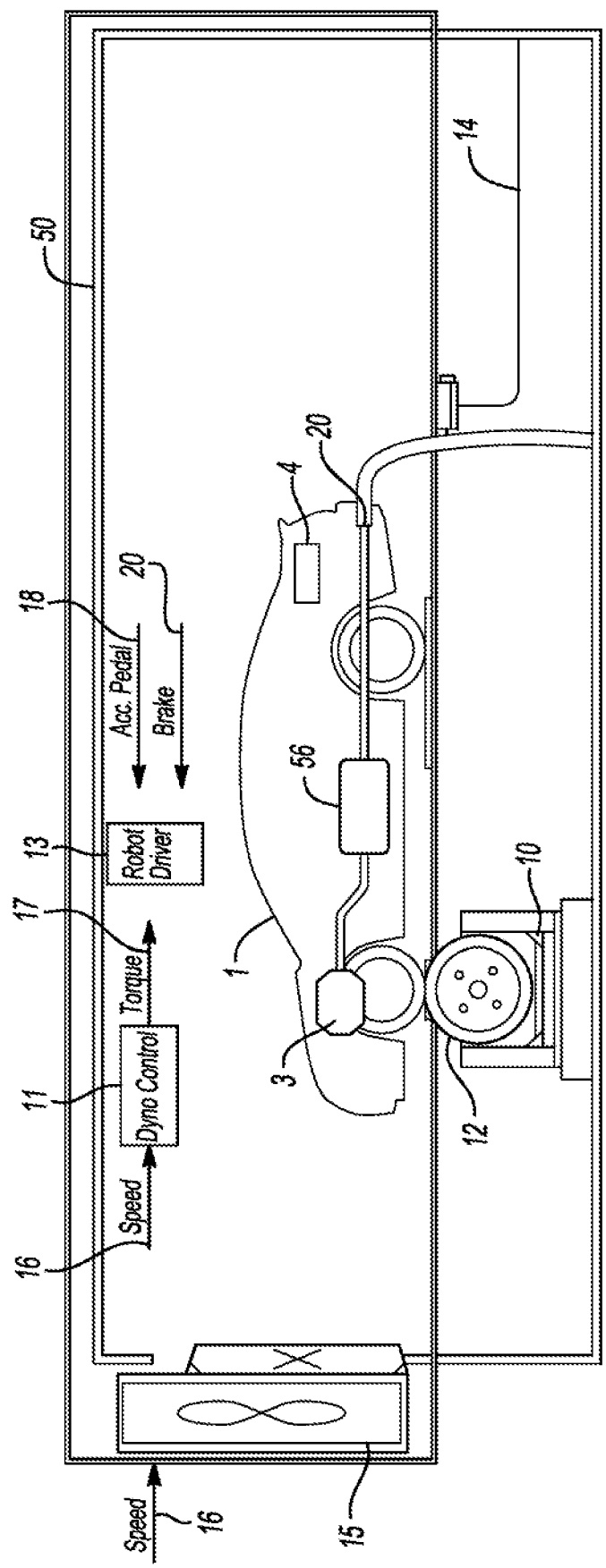
FIG. 3 shows how dynamometer torque is obtained for subsequent laboratory testing purposes and how optional "validation" testing is performed using an environmental chamber.

FIG. 3 shows a first embodiment of a laboratory testing apparatus whereby the vehicle 1 that was previously tested in the real-world, as illustrated in FIG. 2, is subsequently tested in a laboratory equipped with an electric chassis dynamometer 10, located in a temperature, pressure, and humidity controlled environmental chamber 50, as shown in FIG. 3. As apparent to those of ordinary skill, the techniques described with reference to the figures for vehicle testing on a chassis dynamometer of course apply to powertrain testing on an engine dynamometer, etc.

The chassis dynamometer 10 is set to be controlled in "speed mode," i.e. the speed of the dynamometer rolls 12 are controlled by commanding the desired roll 12 speed as a function of time using the desired vehicle 1 speed as a control signal 16. While the vehicle 1 turns the dynamometer rolls 12, or resists the turning of the dynamometer rolls 12, a dynamic torque output signal 17 from the dynamometer control panel 11, indicative of the torque applied by the vehicle 1 to the dynamometer rolls 12 is also monitored and recorded using a recording means (not shown).

A robotic driver 13 commonly used in the field or alternatively, an analogous electronic signal driving control means (not shown) is also employed. The robotic driver 13 may be more appealing to the researcher when electronic interfacing with the vehicle is not possible or not desired. For example, the electronic signal means may be more appealing to a vehicle manufacturer or supplier when there is unlimited access to the necessary information for interfacing with the electronic controls. The robotic driver 13 is able to control the accelerator pedal, brake pedal, clutch pedal, and gear selection lever of the vehicle 1 programmatically and with proper coordination. Or direct-electronic signal control means, when applicable, can be used to affect the same result.

The vehicle 1 is placed on the electric dynamometer rolls 12 in the normal manner for laboratory emissions and/or energy efficiency testing. The dynamometer 10 could have any number of independent rolls, up to one roll per vehicle tire. The temperature, pressure, and humidity controls (not shown) of the environmentally-controlled test cell chamber 50 are all set to the desired values or placed under programmatic control to maintain a changing set of values for the intended test conditions. For example, dynamic programmatic control may be desirable to recreate the changing environmental conditions experienced on a previous real-world test, especially if the real-world test was done in varying altitudes. In the case of a BEV, it may be sufficient to control only the temperature of the environmental test cell chamber 50 to a desired fixed temperature or employ a dynamic temperature schedule.

A large, variable speed fan 15 is used to simulate air flow under and around the vehicle 1, or alternatively, a smaller variable-speed fan may be used to provide cooling to the radiator(s) of the vehicle 1. A large fan capable of simulating dynamic on-road airflows may be preferable for cold-start tests, especially for a vehicle 1 employing a catalytic converter 56, so a real-world cooling effect is reproduced. In either case, the speed of the cooling air is ideally controlled to, or in proportion to the real-world air speed, or the dynamometer roll 12 speed, to simulate on-road air speeds captured with the weather station.

The 100 Hz vehicle speed data 16 schedule previously recorded during the real-world driving is used to control the dynamometer 10 speed during the laboratory testing.

The atmospheric conditions 30 measured during the real-world test are simulated using the environmental test chamber 50. For a BEV vehicle 1, it may be sufficient to control only the test cell temperature. The environmental conditions may be fixed values when appropriate, or may be programmatically coordinated with the vehicle speed and other vehicle parameters so they properly correspond with the vehicle operation that was recorded during the real-world test as previously shown in FIG. 2.

The dynamometer roll 12 speed is then controlled using the recorded vehicle speed 16 from the real-world drive while the accelerator pedal or throttle position, braking action or effort, clutch pedal, and the transmission gear selector, in the case of a manual transmission, are all controlled to the same positions or values 35 that were obtained during the real-world drive, as shown in FIG. 2. Additionally, those controls, the dynamometer speed, and the other simulated conditions, are all synchronized properly in time, to precisely mimic the conditions experienced during the real-world test. In this way, the torque applied by the vehicle 1 tires to the dynamometer rolls 12 is caused to match, to a very close approximation, the torque that the same vehicle 1 had previously applied to the road surface 2 during the real-world test.

The output dynamometer torque signal 17 is recorded from the dynamometer control panel 11 for use in subsequent testing that will take place under different, simulated environmental conditions.

Standard laboratory emissions measurement sampling 14 or optionally PEMS emissions measurement equipment 4 is employed to measure mass emissions data in the usual manner for ICE vehicles 1, and energy consumption measurements are made in the usual manner for BEV vehicles 1.

If PEMS data 19 or energy consumption data was optionally recorded during the real-world drive (FIG. 2), it may be desirable for the first laboratory test to also serve as a "validation" test as shown in FIG. 3. For purposes of validation, the laboratory-measured emissions and energy efficiency data can be compared to the analogous results optionally obtained during the actual real-world test to demonstrate the degree of validity of the testing and method in relation to a set of acceptance criteria.

Figure 4:
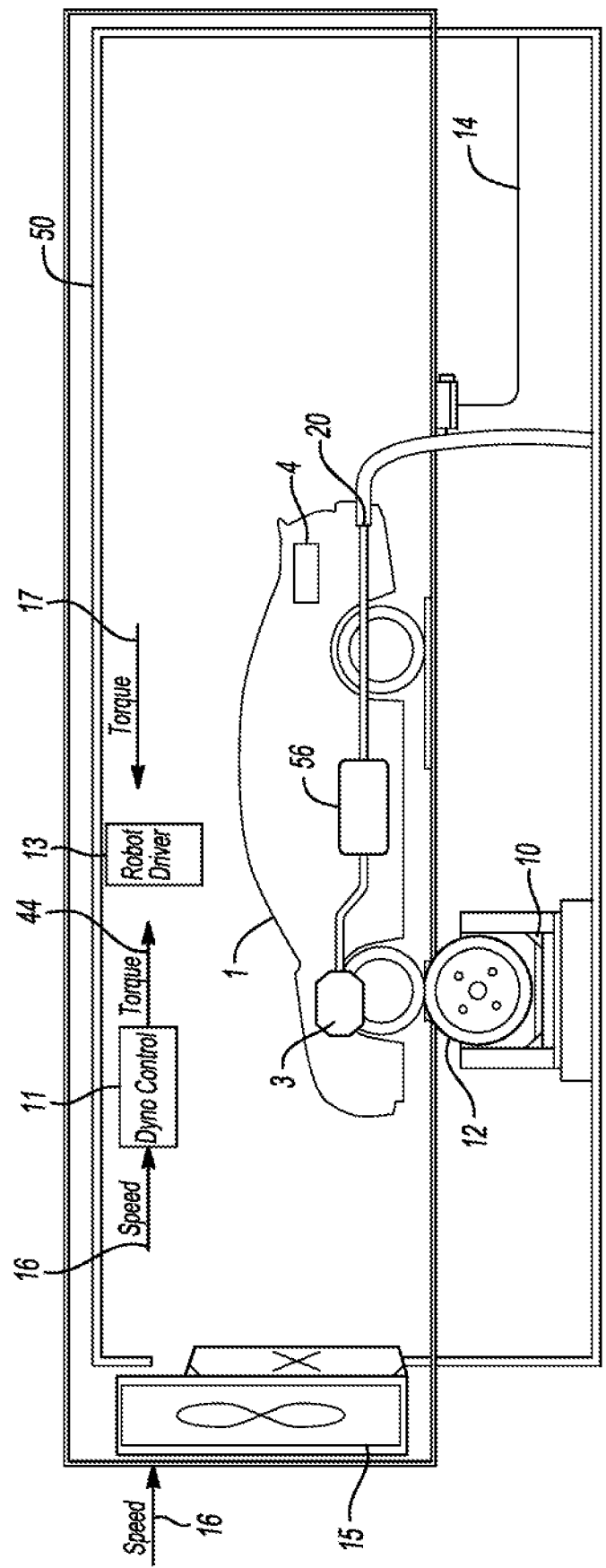
FIG. 4 shows a test arrangement used to simulate real-world driving and to collect simulated real-world emissions data from a vehicle using a chassis dynamometer in an environmental chamber.

Referring to FIG. 4, subsequent dynamometer tests can then be conducted for the purpose of evaluating or demonstrating the emissions and/or energy efficiency of the same vehicle operating on the same route, with the same traffic conditions, etc., but with different environmental or ambient conditions. Or subsequent testing can be for the purpose of evaluating design changes to the vehicle 1 or the vehicle's emissions control system, changes to the powertrain calibration, or any changes to the vehicle 1 that do not significantly affect the road load of the vehicle 1.

To conduct such additional tests under different conditions than the real-world test, the dynamometer 10 is once again controlled in "speed mode." But the vehicle 1 accelerator pedal, brake pedal, or throttle position is controlled differently. Rather than mimic the real-world accelerator pedal position or movement 18 as above, the accelerator pedal (throttle position) and/or brake pedal is controlled by the robotic driver 13, or by direct electronic means, using a feedback loop, which can result in perturbing of the accelerator pedal or brake pedal position. The feedback signal for the feedback loop is the output dynamometer torque signal. The dynamic setpoint or dynamic target value to be achieved is the torque schedule 17 that was recorded from the dynamometer control panel 11 during the simulated real-world testing described above. By controlling the vehicle in this way, it is possible to evaluate the effect on emissions and/or energy efficiency of a vehicle 1 caused by changes made to the vehicle 1 or by changes caused by operating the same vehicle 1 on the same route under the same traffic conditions, but under different environmental conditions as desired. Additional testing can also be done after introducing any desired changes to the vehicle 1 itself (changes that do not significantly affect road load).

Using this new testing method, a single road test performed over a very limited range of temperatures, pressures, and humidity values can be used to enable as many laboratory tests as desired for characterizing the emissions and/or energy efficiency performance of the same vehicle 1 over a wide range of ambient conditions and vehicle design changes. Because the testing is conducted in a laboratory, it can be done in a very repeatable manner. And the effect of changes to emissions controls or powertrain calibrations that do not significantly affect the road load of the vehicle can be evaluated by conducting repeat testing before and after such changes are made.

Repeat tests under different, desired atmospheric test conditions are conducted as above to understand the emissions and/or energy efficiency of the vehicle 1 under a wide range of environmental conditions.

Additionally, if it is not necessary to conduct "validation" tests, the equipment needed for the real-world testing is simply a data logger and a means for measuring the various pedal positions or pedal efforts applied by the driver.

Figure 5:
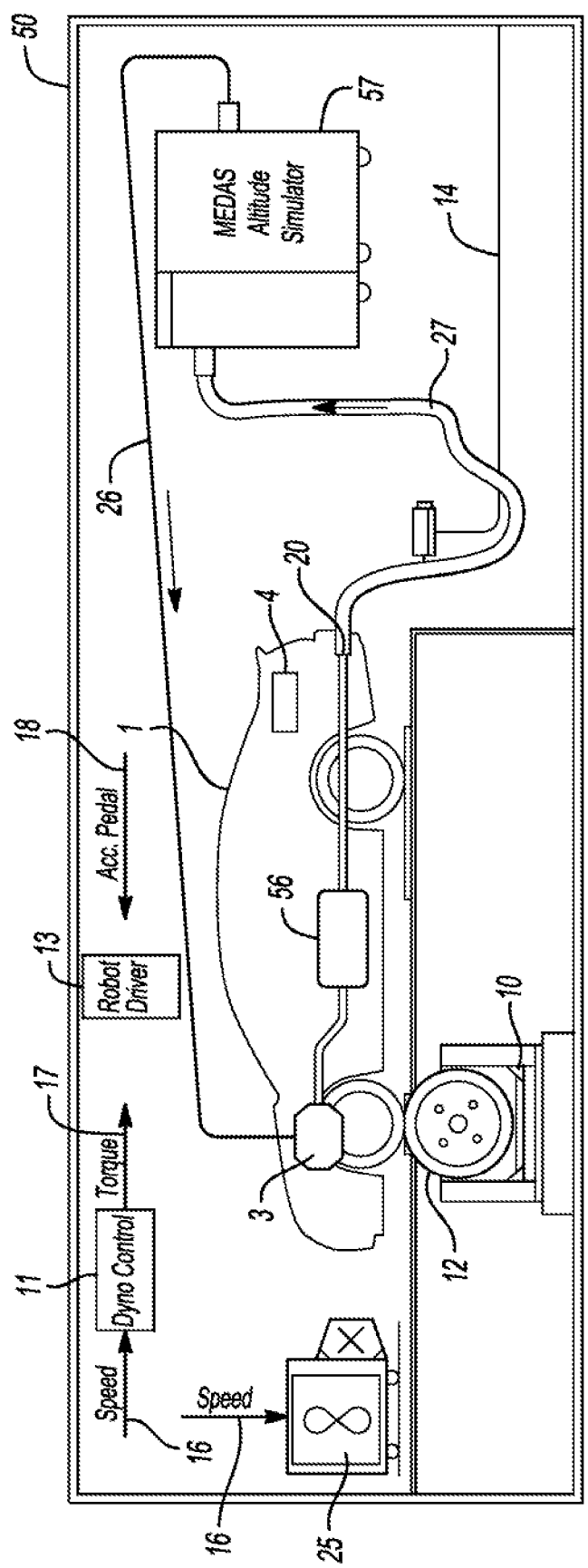
FIG. 5 shows how dynamometer torque is obtained for subsequent laboratory testing purposes and how optional "validation" testing is performed using an environmental condition simulator in place of an environmental chamber.

A second embodiment for testing ICE equipped vehicles is shown in FIG. 5. An "environmental conditions simulator" 57, recently made available by emissions testing equipment manufacturers is employed, rather than employing a more capital intensive environmental testing chamber. This allows the use of a standard emissions test cell 51. The ambient air conditions are simulated by the environmental conditions simulator 57 which is also moveable and can be shared with other test cells. The simulator 57 is connected to the vehicle 1 intake air system of the vehicle's engine 3 by the intake air hose 26 and to the vehicle's tailpipe 20 by the exhaust gas hose 27, whereby the simulator 57 controls the intake air pressure and the exhaust backpressure to either fixed, selected values, or to programmatically controlled, dynamic values to mimic the conditions recorded 30 (FIG. 2) during the real-world test, properly synchronized with the dynamometer roll 12 speed. The humidity of the intake air is also controlled and either the PEMS emissions measurement system 4 or standard laboratory emissions measurements 14 are made to document the emissions and fuel economy performance of the vehicle under the simulated environmental conditions.

Testing with the environmental simulator 57 is conducted in the same manner described above. A variable speed fan 25 provides powertrain cooling and is controlled using either the vehicle ground speed or, preferably, with the measured wind speed that was recorded using the weather station during the on-road drive.

Once again, the first laboratory test may serve as a validation test, or may be to simply capture a torque schedule 17 that is representative of the associated real-world road load torque to be used for subsequent testing under different, simulated environmental conditions, or after vehicle 1 design changes are made.

Figure 6:
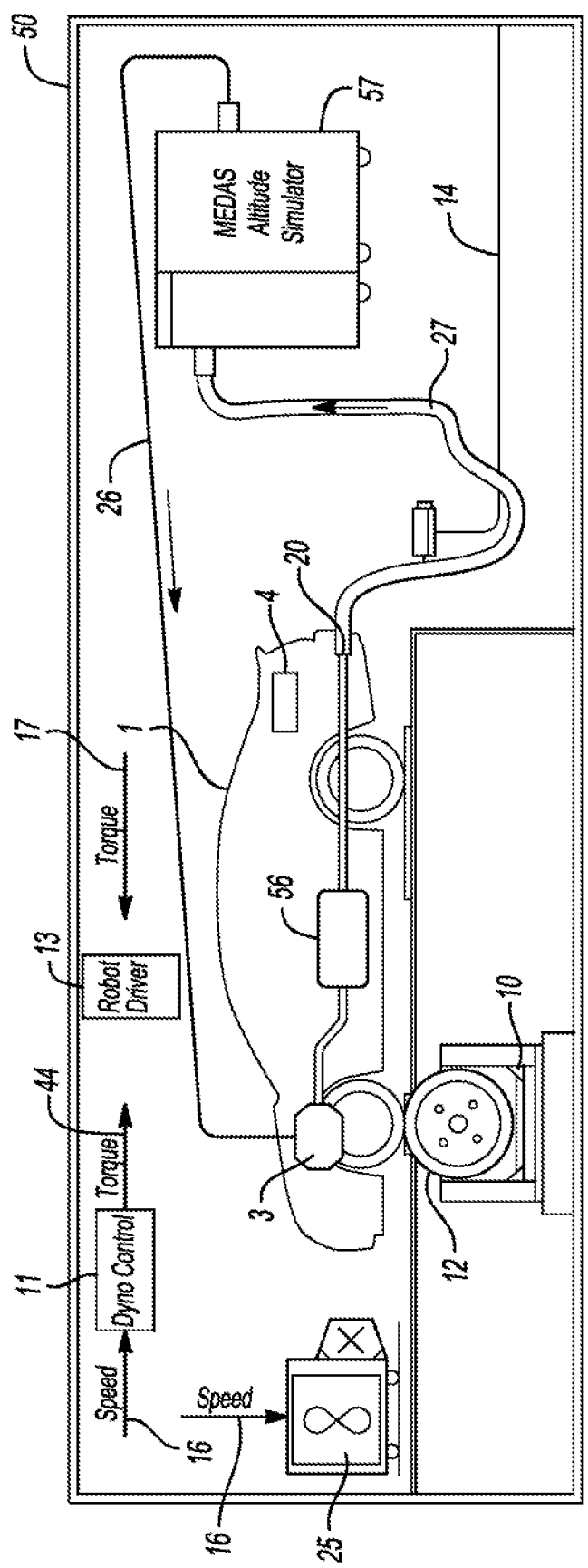
FIG. 6 shows a test arrangement used to simulate real-world driving and to collect simulated real-world emissions data from a vehicle using an environmental condition simulator.

Referring to FIG. 6, repeat tests under different environmental and/or vehicle design test conditions are conducted as described above to help understand the emissions and/or energy efficiency of the vehicle 1 under a wide range of environmental and design conditions. The previously captured torque schedule 17 associated with the real-world road load is used as the reference signal, in conjunction with the output dynamometer torque 44 used as a feedback signal, to control the throttle, employing the robot driver 13 as the actuator for the torque feedback loop.

Figure 7:
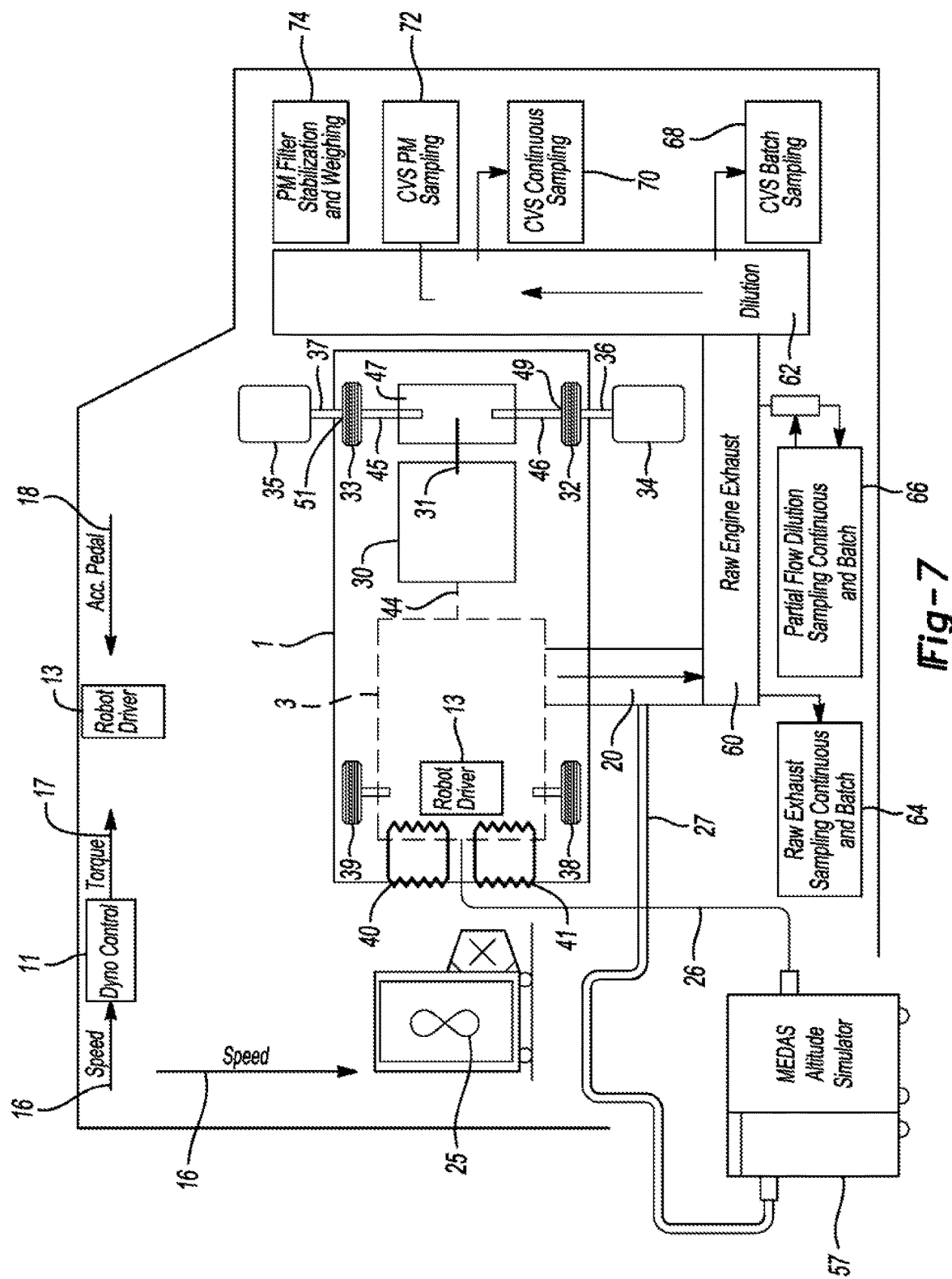
FIG. 7 shows how dynamometer torque is obtained for subsequent laboratory testing purposes and how optional "validation" testing is performed using axle shaft dynamometers.

FIG. 7 shows yet another embodiment of the apparatus. It is similar to the embodiment shown in FIG. 5, except for the use of drive axle dynamometers 34, 35 in place of the chassis dynamometer 10 and dynamometer rolls 12 used in FIG. 5. Specialized wheels 32,33 that employ lockable hub bearings 49, 51 are used to allow the drive axle shafts 45, 46 to freely rotate within the wheels to drive the dynamometer input shafts 36, 37 when they are set to the "unlocked" positions. When they are set to the "locked" positions, the drive axle shafts drive the specialized wheels 32, 33 in a normal manner so the vehicle can be driven and moved to the desired location for testing, Transmission 30, driveshaft 31, wheels 38, 39, coolant radiator 40, oil cooler 41 differential 47, raw engine exhaust line 60, dilution line 62, raw exhaust sampling continuous and batch 64, partial flow dilution sampling continuous and batch 66, constant volume sampling (CVS) batch sampling 68, CVS continuous sampling 70, CVS particulate matter (PM) sampling 72, and PM filter stabilization and weighing 74 are also shown.

During a test, the rotational speeds of the dynamometers 34, 35 are controlled at the appropriate rotational frequency corresponding to the real-world vehicle speed 16 being simulated, with respect to the diameter of the wheels used during the prior real-world test.

Otherwise, testing is conducted in the same manner as described above. After a real-world test as shown in FIG. 2 is conducted, the vehicle 1 control pedal positions 35 from the real-world test are used to control the vehicle while the real-world test ambient conditions are simulated with either an environmental chamber 50 or an environmental condition simulator 57. The dynamometers' 34, 35 torques 17 (two signals) are recorded and the emissions are optionally measured and used in the same manner as describe above for validation, if desired.

Figure 8:
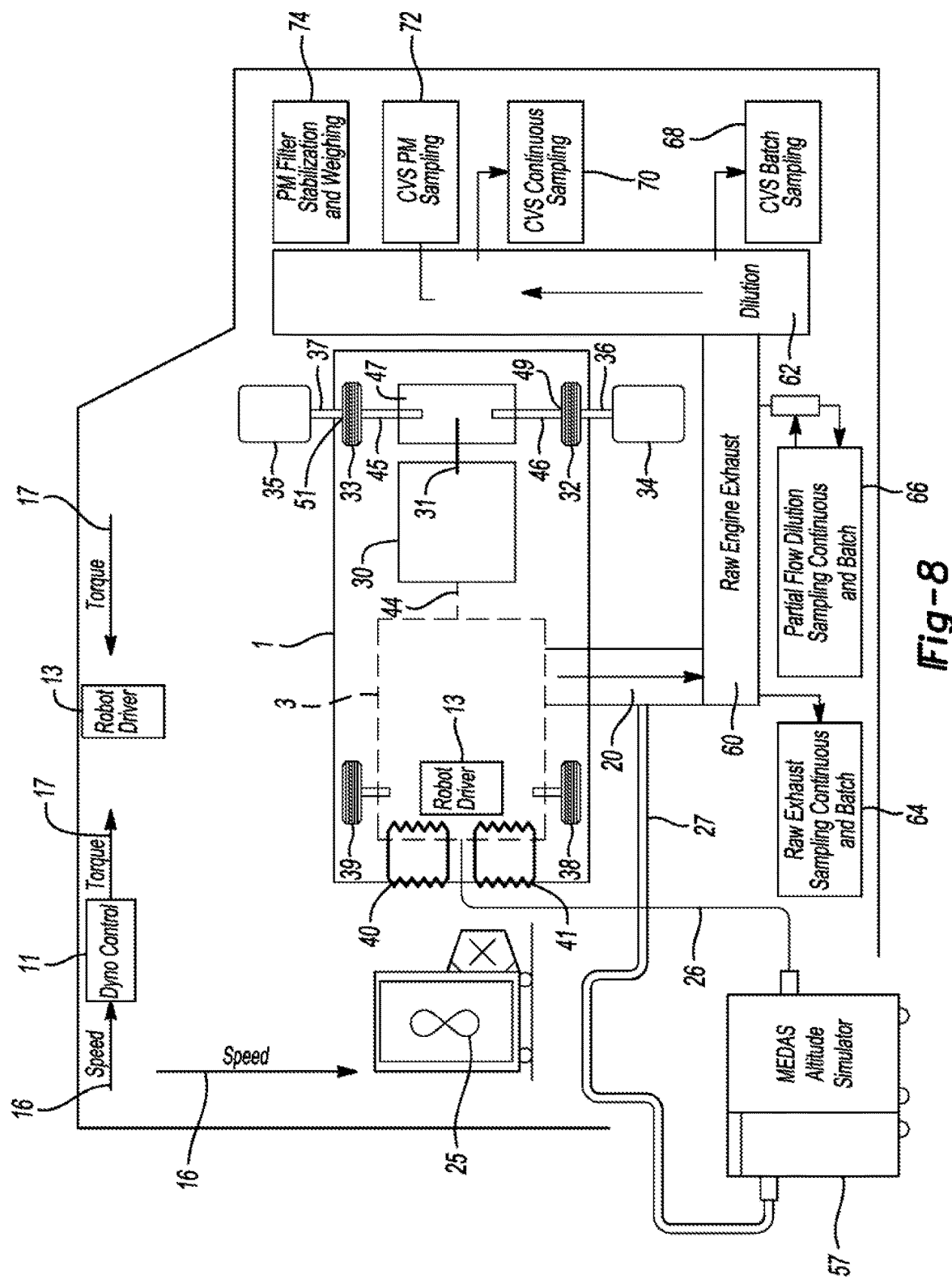
FIG. 8 shows a test arrangement used to simulate real-world driving and to collect simulated real-world emissions data from a vehicle using axle-mounted dynamometers.

FIG. 8 shows how subsequent laboratory testing is done using the drive axle dynamometers 34, 35. The simulated ambient conditions are changed to other desired values of interest, using either the environmentally controlled chamber 50 housing the test cell or an environmental simulator 57 as described above. Rather than control the accelerator pedal to achieve the same pedal positions during the real-world test, the accelerator pedal is controlled with the robot driver 13 to achieve the same torque schedule 17 that was recorded from the dynamometers 34, 35 during the initial laboratory or validation test and using a feedback loop as described above. Exhaust missions and/or energy efficiency parameters are measured and recorded during testing for validation purposes, if they were collected during the real-world driving. Otherwise they are compared with the original laboratory testing results to gauge the effect of whatever changes were made to the simulated environmental conditions or vehicle design.

The embodiment shown in FIG. 7 and FIG. 8 may be most useful for conducting representative "real-world" emissions and energy efficiency testing of vehicles and machines that employ internal combustion engines or driveline components that have been certified to meet engine or component emissions or efficiency standards, rather than vehicle emissions or efficiency standards.

Figure 9:
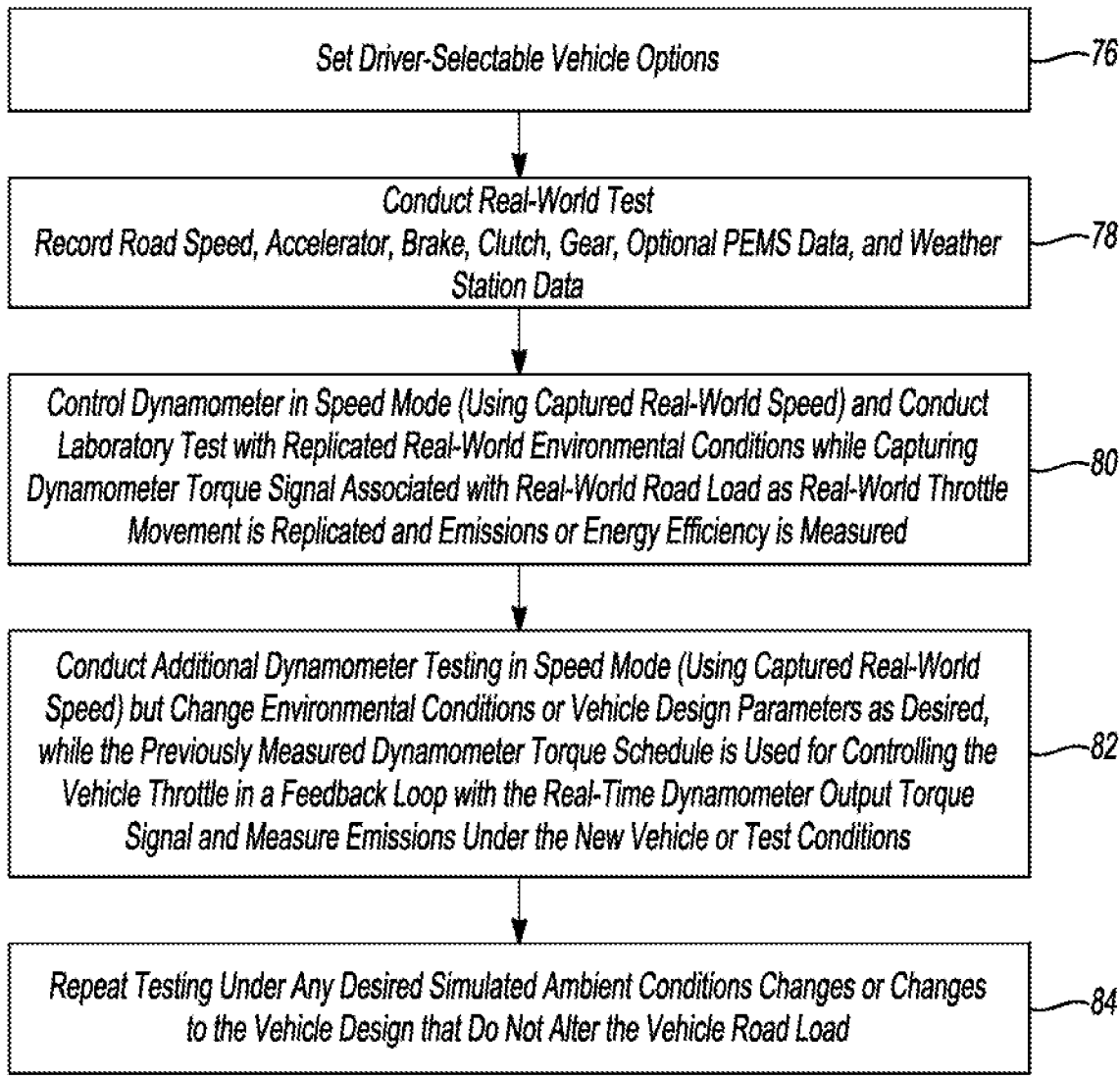
FIG. 9 is a flowchart illustrating an example overall process or test method.

The testing process for collecting a limited amount of real-world driving data and using that data to obtain a real-world torque schedule to subsequently simulate real-world driving in the laboratory is described above and shown in operations 76-84 of FIG.9. Collecting PEMS or energy efficiency data during the real-world drive allows the real-world drive to also be used for test validation purposes.

By collecting real-world vehicle data and using the data in conjunction with one of the apparatuses and methods described above, the emissions and/or energy efficiency of a vehicle 1 (or portion thereof) can be characterized under a wide range of environmental conditions. Effects on the emissions performance or the energy efficiency of a vehicle (or portion thereof) caused by changes to the vehicle design (changes that do not affect the road load of the vehicle) can also be assessed via dynamometer (e.g., chassis dynamometer, engine dynamometer, etc.) as suggested above for any desired route or set of real-world traffic conditions.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims.

As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, case of assembly, etc. As such, embodiments described as less desirable than other embodiments or prior art implementations with respect to one or more characteristics are not outside the scope of the disclosure and may be desirable for particular applications.

What is claimed is:

1. A test method comprising:
   during a first test of a vehicle on a road while an engine of the vehicle is applying dynamic torque, recording throttle positions or accelerator pedal positions to define a driver demand schedule, and recording corresponding speeds of the engine to define a corresponding engine speed schedule; and
   during a second test of a vehicle engine, causing the vehicle engine to reproduce the dynamic torque by simultaneously controlling (i) a throttle or accelerator pedal and (ii) a speed of the vehicle engine using a dynamometer to simultaneously replicate the driver demand schedule and corresponding engine speed schedule.

2. The test method according to claim 1 further comprising during the second test, controlling an exhaust backpressure, an intake air humidity, an intake air pressure, or an intake air temperature according to an ambient air schedule.

3. The test method according to claim 1 further comprising during the second test, controlling an exhaust backpressure, an intake air humidity, an intake air pressure, or an intake air temperature according to an ambient air schedule different than an ambient air schedule present during the first test.

4. The test method according to claim 1 further comprising recording the dynamic torque reproduced during the second test.

5. The test method of claim 1 further comprising recording dynamic torque applied by the dynamometer to the vehicle engine during the second test.

* * * * *